(12) United States Patent
Hasunuma (10) Patent No.: US 9,766,147 B2
(45) Date of Patent: Sep. 19, 2017

(54) PRESSURE SENSOR INCLUDING LEAKAGE DETECTION PART FOR DETECTING LEAKAGE OF LIQUID

(71) Applicant: SURPASS INDUSTRY CO., LTD., Saitama (JP)

(72) Inventor: Masahiro Hasunuma, Saitama (JP)

(73) Assignee: SURPASS INDUSTRY CO., LTD., Saitama (JP)

( * ) Notice: Subject to any disclaimer, the term of this patent is extended or adjusted under 35 U.S.C. 154(b) by 37 days.

(21) Appl. No.: 14/641,767

(22) Filed: Mar. 9, 2015

(65) Prior Publication Data
US 2015/0260601 A1 Sep. 17, 2015

(30) Foreign Application Priority Data

Mar. 14, 2014 (JP) .................................. 2014-051682

(51) Int. Cl.
*G01L 19/00* (2006.01)
*G01L 7/08* (2006.01)
(Continued)

(52) U.S. Cl.
CPC ............ *G01L 19/0092* (2013.01); *G01L 7/08* (2013.01); *G01L 9/06* (2013.01); *G01L 19/0672* (2013.01);
(Continued)

(58) Field of Classification Search
None
See application file for complete search history.

(56) References Cited

U.S. PATENT DOCUMENTS

| 4,450,409 A | * | 5/1984 | Castleman | ............ G01L 19/14 250/384 |
| 4,464,936 A | | 8/1984 | McIntire et al. | |

(Continued)

FOREIGN PATENT DOCUMENTS

| DE | 10 2011 111558 A1 | 2/2013 |
| JP | S50-33886 A | 4/1975 |

(Continued)

OTHER PUBLICATIONS

Communication dated Oct. 20, 2015 from European Patent Application No. 15158375.4, pp. 1-8.

(Continued)

*Primary Examiner* — Andre Allen
(74) *Attorney, Agent, or Firm* — MH2 Technology Law Group LLP (57) ABSTRACT

Provided is a pressure sensor for detecting the pressure of liquid flowing in a main flow path, including: an introduction flow path to which liquid is introduced from the main flow path; a pressure detection element having a pressure receiving surface and for detecting the pressure of liquid received by the pressure receiving surface in the introduction flow path; a diaphragm provided in a downstream-side end part of the introduction flow path and for transferring the pressure of the liquid to the pressure receiving surface while isolating a contact between the liquid in the introduction flow path and the pressure receiving surface; and a leak sensor for detecting a leakage of liquid into an internal space in communication with the pressure receiving surface.

10 Claims, 6 Drawing Sheets

(51) Int. Cl.
*G01M 3/38* (2006.01)
*G01L 9/06* (2006.01)
*G01L 19/06* (2006.01)
*G01L 27/00* (2006.01)
*G01M 3/20* (2006.01)

(52) U.S. Cl.
CPC ............. *G01L 27/007* (2013.01); *G01M 3/20* (2013.01); *G01M 3/38* (2013.01)

(56) References Cited

U.S. PATENT DOCUMENTS

| | | | | |
|---|---|---|---|---|
| 5,092,158 | A * | 3/1992 | Tuma | B67D 7/3209 73/1.05 |
| 2004/0040382 | A1 | 3/2004 | Peterson et al. | |
| 2005/0223781 | A1 * | 10/2005 | Renk | G01L 19/0084 73/46 |
| 2006/0065043 | A1 * | 3/2006 | Cummings | G01M 3/229 73/40.7 |
| 2012/0031162 | A1 * | 2/2012 | Rolff | G01L 21/30 73/1.17 |
| 2013/0214795 | A1 * | 8/2013 | Fife | H01L 27/14632 324/614 |
| 2015/0330858 | A1 * | 11/2015 | Sato | G01L 19/147 73/754 |

FOREIGN PATENT DOCUMENTS

| | | |
|---|---|---|
| JP | H07 72029 A | 3/1995 |
| JP | H08-170934 A | 7/1996 |
| JP | 2552093 B | 11/1996 |
| JP | 2006-529027 A | 12/2006 |

OTHER PUBLICATIONS

Mori, Masayuki (JP Patent Examiner), "Notification of Reasons for Refusal," for corresponding JP Application No. 2014-051682, Issued Aug. 1, 2017, including English-language translation.

* cited by examiner

PRESSURE SENSOR INCLUDING LEAKAGE DETECTION PART FOR DETECTING LEAKAGE OF LIQUID

CROSS-REFERENCE TO RELATED APPLICATIONS

This application is based on Japanese Patent Application No. 2013-051682, the contents of which are incorporated herein by reference in its entirety.

TECHNICAL FIELD

The present disclosure relates to a pressure sensor for detecting the pressure of liquid.

BACKGROUND ART

Conventionally, a pressure sensor has been used to detect the pressure of liquid flowing in a flow path. As such a pressure sensor, there is known a single-port type pressure sensor which introduces liquid from a main flow path, in which the liquid is flowing, into an introduction flow path, and detects the pressure of the introduced liquid (see, for example, Patent Literature 1).

When the pressure of the liquid which is introduced from the main flow path is detected via a pressure sensitive part (pressure receiving surface) of a sensor element, if the pressure sensor is configured such that the liquid comes into direct contact with the pressure sensitive part, there is a risk that a part of the pressure receiving surface or a sealing member, such as an O-ring, which is brought into contact with the pressure receiving surface, dissolves due to the effect of the liquid (for example, a corrosive solution) and thereby contaminates the liquid flowing in the main flow path.

Patent Literature 1 discloses a pressure sensor in which a diaphragm part for isolating the contact between the liquid and the sensor element is provided at an end part of a fluid introduction part (introduction flow path) so that the pressure of the liquid is transferred to a pressure sensitive part via the diaphragm part.

CITATION LIST

Patent Literature (PTL 1)
Publication of Japanese Patent No. 2552093

SUMMARY

However, in the pressure sensor disclosed in Patent Literature 1, when the diaphragm part, which isolates the contact between the liquid introduced in the fluid introduction part and the pressure sensitive part of the sensor element, is damaged due to deterioration over time etc. and the liquid flows into a space in which the pressure sensitive part of the sensor element is placed, it is not possible to detect the inflow of liquid into the space.

Therefore, when the liquid flows into the space in which the pressure sensitive part is placed, a part of the pressure receiving surface or a sealing member, such as an O-ring, which is brought into contact with the pressure receiving surface, may dissolve due to the effect of the liquid, thereby contaminate the liquid flowing in the main flow path.

The present disclosure has been made in view of the above described circumstances, and has its object to prevent an inconvenience that liquid flowing in a main flow path is contaminated, in a pressure sensor including a diaphragm which isolates the contact between liquid in an introduction flow path and a pressure receiving surface of a pressure detection part.

The present disclosure has adopted the following means to solve the above described problem.

The pressure sensor according to the present disclosure is a pressure sensor for detecting pressure of liquid flowing in a main flow path, comprising: an introduction flow path into which the liquid is introduced from the main flow path; a pressure detection part having a pressure receiving surface and for detecting the pressure of liquid received by the pressure receiving surface in the introduction flow path; a diaphragm provided in a downstream-side end part of the introduction flow path and for transferring the pressure of the liquid to the pressure receiving surface while isolating the contact between the liquid in the introduction flow path and the pressure receiving surface; and a leakage detection part for detecting a leakage of liquid into an internal space in communication with the pressure receiving surface.

The pressure sensor according to the present disclosure is provided with a diaphragm in a downstream-side end part of an introduction flow path into which liquid is introduced from a main flow path, thereby isolating the contact between the liquid in the introduction flow path and the pressure receiving surface of the pressure detection part. Therefore, it is possible to prevent an inconvenience that a part of the pressure receiving surface or a sealing member, such as an O-ring, which is brought into contact with the pressure receiving surface, dissolves, thereby contaminating the liquid flowing in the main flow path. Moreover, even if the diaphragm is damaged due to deterioration over time or the like, leakage of liquid into an internal space in communication with the pressure receiving surface of the pressure detection part can be appropriately detected by the leakage detection part. Thus, it is possible to prevent an inconvenience that the liquid flowing in the main flow path is contaminated, by repairing or replacing the diaphragm when leakage of liquid into the internal space is detected.

The pressure sensor of a first aspect of the present disclosure is configured such that the introduction flow path and the diaphragm are integrally formed from a single material.

Thus, integrally forming the introduction flow path and the diaphragm from a single material, thereby eliminating a physical gap in a connection portion between the introduction flow path and the diaphragm makes it possible to reliably prevent an inconvenience that the liquid in the introduction flow path leaks into the internal space.

The pressure sensor of a second aspect of the present disclosure includes a communication flow path for bringing the internal space and the outside of the pressure sensor into communication with each other.

Since this configuration causes the internal space to be brought into communication with the outside of the pressure sensor, even if the diaphragm deforms in a direction closer to or away from the pressure receiving surface depending on the pressure of the liquid introduced into the introduction flow path and thereby the volume of the internal space changes, the pressure of the internal space is kept constant. Therefore, the diaphragm smoothly deforms depending on the pressure of the liquid, and the pressure detection part, which includes a pressure receiving surface to which the pressure of liquid is transferred from the diaphragm, can accurately detect the pressure of the liquid.

The pressure sensor of a third aspect of the present disclosure is configured such that the diaphragm has a substantially annular shape in plan view; and further comprises a protruding part, which is connected to an inner peripheral edge part of the diaphragm and protrudes further toward the pressure receiving surface with respect to a plane where the diaphragm is disposed, and the diaphragm transfers pressure of liquid to the pressure receiving surface via the protruding part.

This configuring makes it possible to cause the diaphragm having a substantially annular shape to deform depending on the pressure of the liquid, and to reliably transfer the pressure of liquid to the pressure receiving surface via the protruding part connected to the inner peripheral edge part of the diaphragm.

The pressure sensor of a fourth aspect of the present disclosure is configured such that the diaphragm has a substantially circular shape in plan view; and the diaphragm is deformed depending on pressure of the liquid which is introduced into the introduction flow path, thereby transferring the pressure of the liquid to the pressure receiving surface.

This configuration makes it possible to cause the diaphragm having a substantially circular shape to be deformed depending on the pressure of the liquid, thereby transferring the pressure of the liquid to the pressure receiving surface directly from the diaphragm over a wide area thereof.

The pressure sensor of a fifth aspect of the present disclosure is configured such that the diaphragm has a corrugated shape in sectional view.

This configuration makes it possible to reliably transfer the pressure of the liquid to the pressure receiving surface by using the diaphragm having a corrugated shape which is more likely to be deformed depending on the pressure of the liquid.

The pressure sensor of a sixth aspect of the present disclosure is configured such that the pressure receiving surface has a substantially circular shape in plan view; the pressure detection part is accommodated in a housing by bringing the outer peripheral edge part of the pressure receiving surface into contact with the housing; and an O-ring is provided for shutting off the inflow of the liquid into the pressure detection part from the internal space is provided on a contact part where the outer peripheral edge part of the pressure receiving surface and the housing are in contact with each other.

This configuration makes it possible to prevent the liquid from flowing out from the internal space to another portion by shutting it off with the O-ring even when the diaphragm is damaged due to deterioration over time, thereby causing an inconvenience that the liquid leaks into the internal space.

The pressure sensor of a seventh aspect of the present disclosure is configured such that the leakage detection part is a reflection type detector which detects leakage of liquid into the internal space by detecting reflected light, which comes from the internal space, of the irradiation light radiated toward the internal space from a light source.

This configuration makes it possible to reliably detect leakage of liquid by using a reflection type detector which is less likely to deteriorate due to the effect of liquid (for example, a corrosive solution).

The pressure sensor of a eighth aspect of the present disclosure is configured such that portions of the housing and the leakage detection part, which are in abutment with the internal space, are each formed of fluororesin and a portion of the pressure receiving surface, which is in abutment with the internal space, is formed of sapphire.

This configuration makes it possible to prevent an inconvenience that impurities dissolve due to liquid flown into the internal space even when the diaphragm is damaged due to deterioration over time, thereby causing an inconvenience that liquid leaks into the internal space.

According to the present disclosure, it is possible to prevent an inconvenience that liquid flowing in a main flow path is contaminated, in a pressure sensor including a diaphragm for isolating the contact between the liquid in an introduction flow path and a pressure receiving surface of a pressure detection part.

DESCRIPTION OF EMBODIMENTS

First Embodiment

Hereafter, a pressure sensor of a first embodiment of the present disclosure will be described with reference to the drawings.

Figure 1:
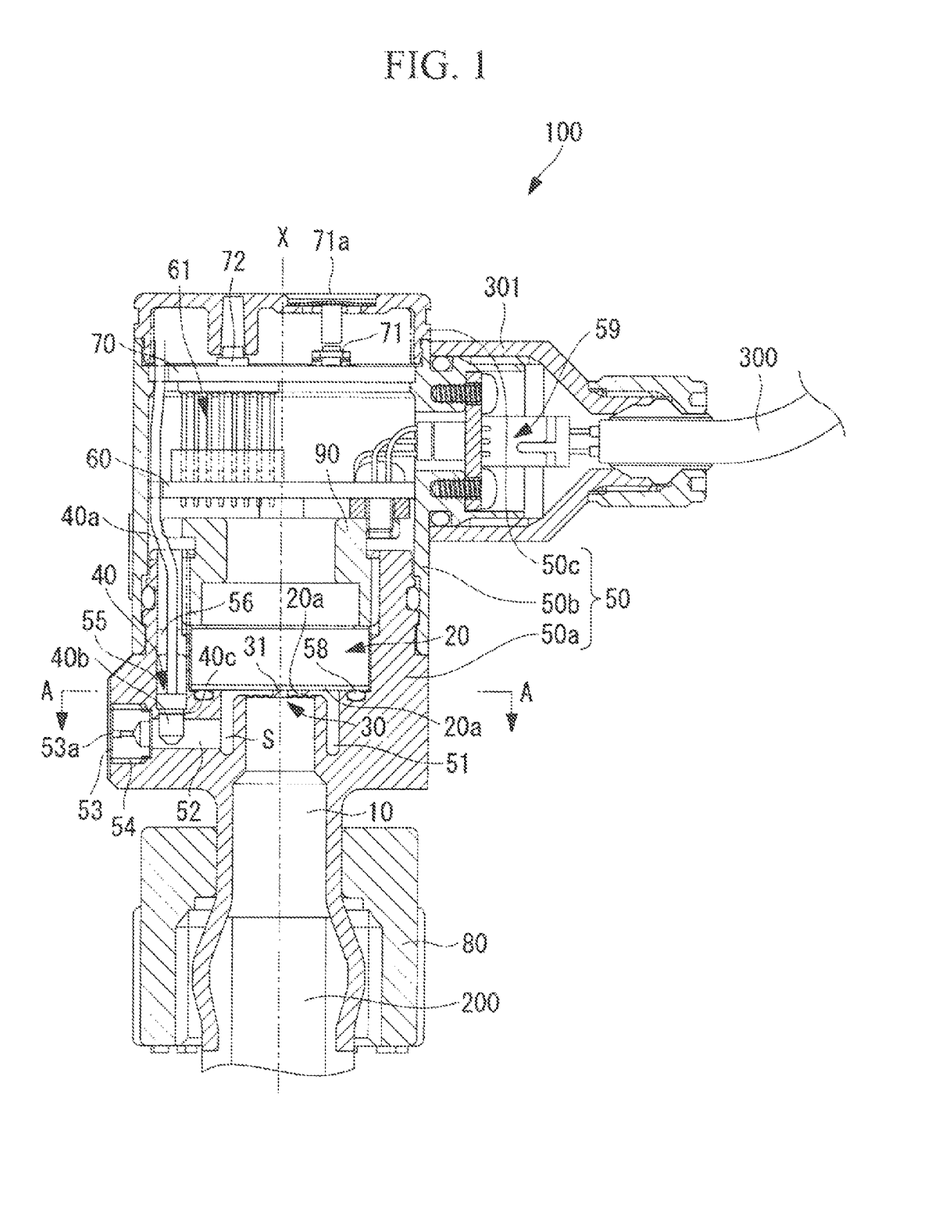
FIG. 1 is a longitudinal sectional view to show an internal structure of a pressure sensor of a first embodiment.

A pressure sensor 100 of the present embodiment is connected to a piping (not shown) which forms a main flow path for supplying liquid to a semiconductor manufacturing facility and the like. The pressure sensor 100 is an apparatus for detecting the pressure of liquid flowing in a main flow path 200. While the pressure sensor 100 can detect various liquids as the object to be detected, for example, corrosive solutions including nitric acid ($HNO_3$), hydrochloric acid (HCL), sulfuric acid ($H_2SO_4$), hydrofluoric acid, and the like are the objects to be detected.

The pressure sensor 100 includes an introduction flow path 10, a pressure detection element 20 (pressure detection part), a diaphragm 30, a leak sensor 40 (leakage detection part), a housing 50, a first circuit substrate 60, and a second circuit substrate 70.

The introduction flow path 10, which is a flow path to which liquid is introduced from the main flow path 200, is provided with the diaphragm 30 in its downstream-side end part. The introduction flow path 10 is formed from a body part 50a constituting the housing 50. The body part 50a and the diaphragm 30, which form the introduction flow path 10, are integrally formed from a single fluororesin material (for example, PTFE). The body part 50a and the main flow path 200 of the pressure sensor 100 are fastened together with a cap nut 80.

The pressure detection element 20 includes a pressure receiving surface 20a and works as an element for detecting the pressure of liquid received by the pressure receiving surface 20a in the introduction flow path 10. The pressure defection element 20 of the present embodiment is a strain gauge type element which detects pressure based on the change in the electric resistance value of a metal resistor (not shown) provided on a sapphire substrate forming the pressure receiving surface 20a. A portion in abutment with the internal space S to be described below of the pressure receiving surface 20a of the pressure detection element 20 is formed of sapphire having corrosion resistance.

The diaphragm 30 is a member like a thin film which transfers the pressure of liquid to the pressure receiving surface 20a while isolating the contact between the liquid in the introduction flow path 10 and the pressure receiving surface 20a of the pressure detection element 20.

Figure 2:
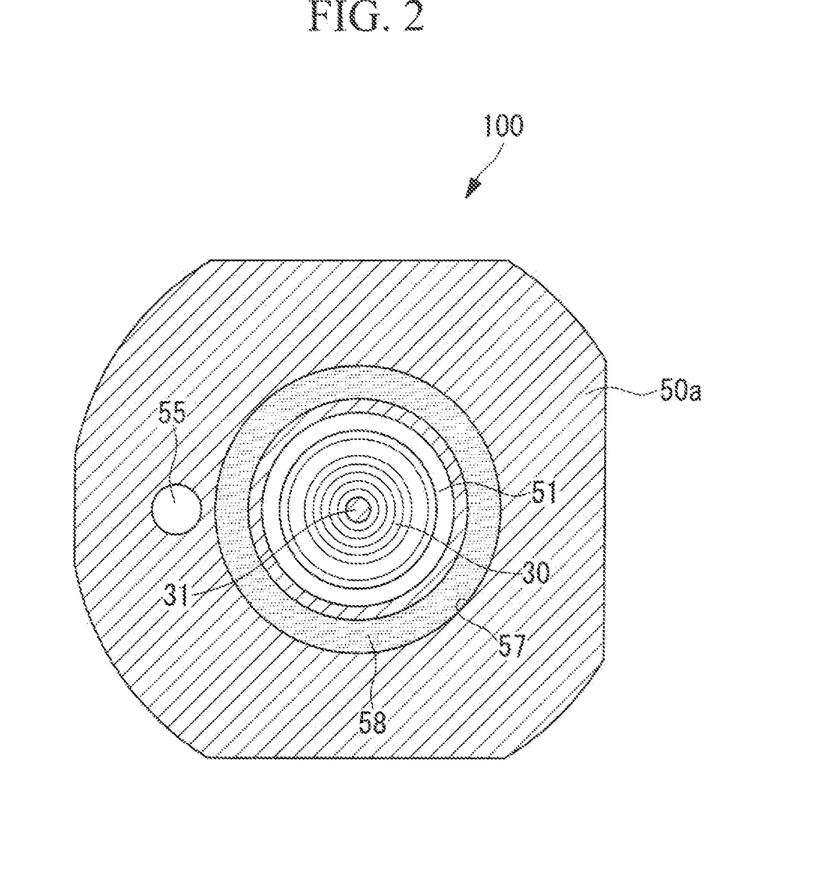
FIG. 2 is a cross sectional view of the pressure sensor shown in FIG. 1 as seen from arrowed direction A-A.
Figure 3:
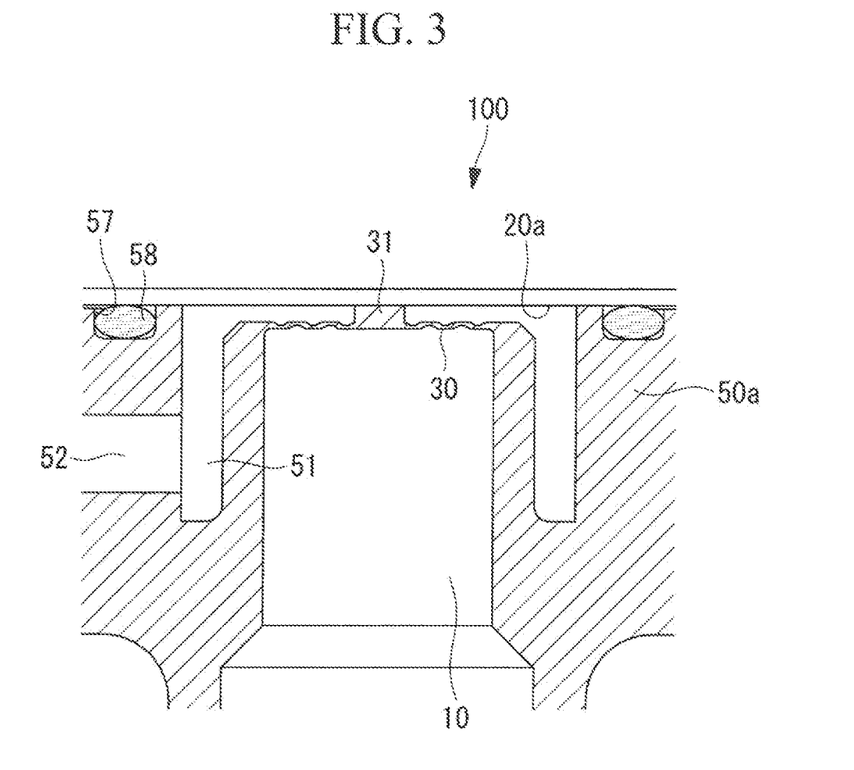
FIG. 3 is a longitudinal sectional view to show the vicinity of a diaphragm of the pressure sensor shown in FIG. 1.

As shown in FIG. 2, the diaphragm 30 of the present embodiment has a substantially annular shape in plan view. As shown in FIGS. 2 and 3, a protruding part 31 protruding further toward the pressure receiving surface 20a with respect to the surface where the diaphragm 30 is disposed is connected to the inner peripheral edge part of the diaphragm 30.

It is noted that the section shown in the sectional view of FIG. 2 corresponds to the plane passing through the contact part where the pressure receiving surface 20a and an O-ring 53 are in contact with each other. Therefore, in FIG. 2, the pressure receiving surface 20a is not shown, and members which are disposed below the pressure receiving surface 20a are shown.

The diaphragm 30 is configured to be deformed in a direction closer to the pressure receiving surface 20a as the pressure of liquid in the introduction flow path 10 increases. The deformation of the diaphragm 30 is transferred to the pressure receiving surface 20a via the protruding part 31. In this way, the diaphragm 30 transfers the pressure of the liquid in the introduction flow path 10 to the pressure receiving surface 20a via the protruding part 31. As shown in FIG. 3, the diaphragm 30 has a corrugated shape in sectional view. For that reason, the diaphragm 30 is easy to be deformed depending on the pressure of the liquid in the introduction flow path 10.

The leak sensor 40 is a sensor for detecting leakage of liquid into an internal space S which is in communication with the pressure receiving surface 20a and the diaphragm 30. The leak sensor 40 includes a light emitting element (not shown), a light receiving element (not shown), an optical fiber 40a, and a resin head 40b. The optical fiber 40a is made up of two optical fibers: one for guiding irradiation light which is guided from the light emitting element to the resin head 40b, and another for guiding reflected light which is guided from the resin head 40b to the light receiving element. The resin head 40b is a member formed of a corrosion resistant fluororesin (for example, PFA).

The leak sensor 40 radiates irradiation light, which is guided by the optical fiber 40a from the light emitting element (not shown) which is a light source mounted on the second circuit substrate 70, toward the internal space S. When there is no liquid in the vicinity of the resin head 40b in the internal space S, the irradiation light is reflected at a boundary between the resin head 40b and the internal space S toward inside the resin head 40b, and is guided to the light receiving element via the optical fiber 40a. On the other hand, when there is liquid in the vicinity of the resin head 40b in the internal space S, the irradiation light is reflected at the boundary between the resin head 40b and the liquid, toward the internal space S. In the latter case, the reflected light will not be guided by the optical fiber 40a, and the light receiving element will not receive the reflected light.

The leak sensor 40 determines that there is no leakage of liquid into the internal space S when reflected light is detected by the light receiving element, and that there is leakage of liquid into the internal space S when reflected light is not detected by the light receiving element. In this way, the leak sensor 40 is configured as a reflection type detector which detects leakage of liquid into the internal space S by detecting reflected light, which comes from the internal space S, of the irradiation light radiated toward the internal space S from the light emitting element.

The housing 50 is a member for accommodating the pressure detection element 20 thereinside, and is formed of a corrosion resistant fluororesin (for example, PTFE). The housing 50 is made up of a body part 50a, a cover part 50b, and a lid part 50c.

The body part 50a is member inside of which the introduction flow path 10 connected to the main flow path 200 and extending in the X-axis direction is formed. The diaphragm is provided at a downstream-side end part of the body part 50a. An annular recess 51, which defines the internal space S together with the pressure receiving surface 20a, is formed on the outer peripheral side in the radial direction of the X-axis at the downstream-side end part of the introduction flow path 10.

As shown in the cross sectional view of FIG. 3, the diaphragm 30 and the annular recess 51 have a substantially annular shape in plan view.

A leakage detection hole 52, which extends in a direction normal to the X-axis from the vicinity of a bottom part of the annular recess 51, and has a substantially circular shape in sectional view, is formed in the body part 50a. The space defined by the leakage detection hole 52 is in communication with the space defined by the annular recess 51. The internal space S is a space defined by the leakage detection hole 52, the annular recess 51, and the pressure receiving surface 20a.

A sealing plug 53 for isolating the leakage detection hole 52 from the external space of the pressure sensor 100 is provided in the outer side in the radial direction of the X-axis of the leakage detection hole 52. A male thread part is provided on the outer peripheral surface of the sealing plug 53. The sealing plug 53 is mounted to the body part 50a by fastening the male thread part provided on the outer peripheral surface of the sealing plug 53 to a female thread part provided on the inner peripheral surface of an opening hole 54 in communication with a leakage detection hole 52 provided in the body part 50a.

A communication flow path 53a, which is a through hole extending in a radial, direction normal to the X-axis, is provided in a central part of the sealing plug 53. The communication flow path 53a brings the internal space S and the outside (outside air) of the pressure sensor 100 into communication with each other. Therefore, the internal space S becomes kept at the atmospheric pressure, and the deformation of the diaphragm 30 will not be obstructed by the pressure of the internal space S so that an easily deferrable state thereof is maintained.

As shown in FIGS. 1 and 2, a leak sensor mounting hole 55 which extends in a direction corresponding to the X-axis direction is provided in the body part 50a. A leak sensor 40 is inserted into the leak sensor mounting hole 55 such that a distal end of the resin head 40b is exposed to the leakage detection hole 52. The resin head 40b is provided with an annular sealing member 40c for preventing infiltration of liquid into the leak sensor mounting hole 55 from the leakage detection hole 52. Moreover, a caulking member 56 which prevents infiltration of liquid to upward while supporting the optical fiber 40a is provided. The caulking member 56 is for the purpose of preventing the liquid, which has passed through the sealing member 40c and infiltrated into the leak sensor mounting hole 55, from infiltrating further upwardly.

As shown in FIGS. 2 and 3, the body part 50a is provided with an annular channel part 57 having a substantially annular shape in plan view, on the outer peripheral side of the annular recess 51. The annular channel part 57 is provided with an O-ring 58. The portion where the O-ring 58 is provided forms a contact part where the outer peripheral edge part of the pressure receiving surface 20a having a substantially circular shape in plan view and the body part 50a come into contact. This contact part shuts off the inflow of liquid from the internal space S to the pressure detection element 20.

An upper end part of the body part 50a along the X-axis is formed into a cylindrical shape with the X-axis as the center axis, and a female thread part is formed in the inner peripheral surface thereof. A male thread part formed on the outer peripheral surface of a cylindrical sensor retaining member 90 is fastened to the female thread part. The pressure detection element 20 is positioned with respect to the body part 50a by means of the body part 50a and the sensor retaining member 90.

The cover part 50b is a cylindrical member which is disposed on the X-axis coaxially with the body part 50a. The inner peripheral surface of a lower end part along the X-axis of the cover part 50b is engaged with the outer peripheral surface of the upper end part along the X-axis of the body part 50a. The engagement part between the cover part 50b and the body part 50a is shielded by an O-ring.

The lid part 50c is a cylindrical member which is disposed on the X-axis coaxially with the cover part 50b. The inner peripheral surface of the lower end part of the lid part 50c along the X-axis is engaged with the outer peripheral surface of the upper end part of the cover part 50b along the X-axis.

The cover part 50b accommodates a first circuit substrate 60 and a second circuit substrate 70 thereinside. The lid part 50c protects the first circuit substrate 60 and the second circuit substrate 70 in the cover part 50b, and the pressure detection element 20 from the outside.

The first circuit substrate 60 is a substrate to which a power supply line and a signal line of external wiring 300 connected to an external apparatus (not shown) are connected. The first circuit substrate 60 provides power supply to the pressure detection element 20 and receives a pressure detection signal detected by the pressure detection element 20. The first circuit substrate 60 transfers a pressure detection signal received from the pressure detection element 20 to the external apparatus via a signal line of the external wiring 300.

The second circuit substrate 70 is a substrate connected with the first circuit substrate via wiring 61. The wiring 61 includes a power supply line for providing power supply, and a plurality of signal lines for transmitting/receiving various signals. The second circuit substrate 70 includes a control circuit (not shown) for controlling the light emitting element and the light receiving element included in the leak sensor 40. A detection result of reflected light by the light receiving element of the leak sensor 40 is transferred to the external apparatus connected to the external wiring 300 via the wiring 61 and the first circuit substrate 60.

The second circuit substrate 70 includes a zero-point adjustment circuit 71 for performing zero-point adjustment of the pressure detection element 20. The zero-point adjustment is processing for adjusting a pressure detection signal outputted by the pressure detection element 20. Upon depression of a zero-point adjustment button 71a on the upper surface of the lid part 50c while the pressure in the introduction flow path 10 is kept at a reference pressure (for example, atmospheric pressure), the zero-point adjustment circuit 71 performs the zero-point adjustment processing. To be specific, the zero-point adjustment circuit 71 corrects the pressure signal inputted from the pressure detection element 20 such that the pressure signal upon depression of the zero-point adjustment button shows a value indicating the reference pressure.

The second circuit substrate 70 includes a light emission control circuit 72. The light emission control circuit 72 is a circuit for controlling the light emitting element to make a report of the operating state of the pressure sensor 100. The light emission control circuit 72 controls the light emitting element so at to emit light when power supply is provided from the external apparatus via the external wiring 300. Moreover, for example, the light emitting element is controlled so as to blink when the zero-point adjustment button 71a is depressed and the aero-point adjustment circuit 71 is performing aero-point adjustment. Further, the light emission control circuit 72 controls the light emitting element so as to differentiate between the color (for example, green) when no leakage of liquid is detected by the leak sensor 40 and the color (for example, orange) when leakage of liquid is detected, when power supply is provided from the external apparatus via the external wiring 300.

A coupling part 59 is a member which is provided in the cover part 50b, and to which the external wiring 300 for transferring a pressure detection signal to the external apparatus is coupled. A female side connector is provided in the distal end of the coupling part 59, and a male side connector is provided in a connection part 301 at the distal end of the external wiring 300. Connecting the female side connector with the male side connector causes the first circuit substrate 60 and the external wiring 300 to be electrically connected.

The actions and effects provided by the pressure sensor 100 of the present embodiment described so far will be described.

The pressure sensor 100 of the present embodiment is configured such that the diaphragm 30 is provided in the downstream-side end part of the introduction flow path 10 into which liquid is introduced from the main flow path 200, thereby isolating the contact between the liquid in the introduction flow path 10 and the pressure receiving surface 20a of the pressure detection element 20. Therefore, it is possible to prevent an inconvenience that a part of the pressure receiving surface 20a or the O-ring 58 in contact with the pressure receiving surface 20a dissolves, and thereby contaminating the liquid flowing in the main flow path 200.

Moreover, even if the diaphragm 30 is damaged due to deterioration over time, or the like, it is possible to appropriately detect leakage of liquid into the internal space S, which is in communication with the pressure receiving surface 20a of the pressure detection element 20, by the leak sensor 40. Therefore, by repairing or replacing the diaphragm 30 when leakage of liquid into the internal space S is detected, it is possible to prevent the inconvenience that the liquid flowing in the main flow path 200 is contaminated.

The pressure sensor 100 of the present embodiment is configured such that the introduction flow path 10 and the diaphragm 30 are integrally formed from a single fluororesin material.

Thus, by integrally forming the introduction flow path 10 and the diaphragm 30 from a single fluororesin material, thereby eliminating a physical gap in a connection portion between the introduction flow path 10 and the diaphragm 30, it is possible to reliably prevent an inconvenience that liquid in the introduction flow path 10 leaks out into the internal space S.

The pressure sensor 100 of the present embodiment is configured to include a communication flow path 53a which brings the internal space S and the outside of the pressure sensor 100 into communication with each other.

Since this configuration causes the internal space S to come into communication with the outside of the pressure sensor 100, even if the diaphragm 30 deforms in a direction closer to or away from the pressure receiving surface 20a depending on the pressure of the liquid introduced in the introduction flow path 10, and thereby the volume of the internal space S changes, the pressure of the internal space S is kept constant. Therefore, the diaphragm 30 smoothly deforms depending on the pressure of the liquid, and the pressure detection element 20, which includes a pressure receiving surface 20a to which the pressure of the liquid is transferred from the diaphragm 30, can accurately detect the pressure of the liquid.

The pressure sensor 100 of the present embodiment is configured to include a diaphragm 30 having a substantially annular shape in plan view, and a protruding part 31 connected to the inner peripheral edge part of the diaphragm 30 and protruding further toward the pressure receiving surface 20a with respect to the plane where the diaphragm 30 is disposed. The diaphragm 30 transfers the pressure of liquid to the pressure receiving surface 20a via the protruding part 31.

This configuration makes it possible to cause the diaphragm having a substantially annular shape to deform depending on the pressure of liquid, and to reliably transfer the pressure of the liquid to the pressure receiving surface 20a via the protruding part 31 connected to the inner peripheral edge part of the diaphragm 30.

The pressure sensor of the present embodiment is configured such that the diaphragm 30 has a corrugated shape in sectional view.

This configuration makes if possible to reliably transfer the pressure of liquid to the pressure receiving surface 20a by using the diaphragm 30 having a corrugated shape, which is easier to be deformed depending on the pressure of the liquid.

The pressure sensor 100 of the present embodiment is configured such that the pressure receiving surface 20a has a substantially circular shape in plan view. Moreover, the pressure detection element 20 is accommodated in the housing 50 with the outer peripheral edge part of the pressure receiving surface 20a and the body part 50a of the housing 50 being brought into contact with each other. Moreover, an O-ring 58 for shutting off the inflow of liquid from the infernal space S to the pressure detection element 20 is provided in a contact part where the outer peripheral part of the pressure receiving surface 20a and the body part 50a come into contact.

This configuration makes it possible to prevent the liquid from flowing out from the internal space S to another portion by shutting it off with the O-ring 58, even when the diaphragm 30 is damaged due to deterioration over time, causing an inconvenience that the liquid leaks into the internal space S.

The pressure sensor 100 of the present embodiment is configured such that the leak sensor 40 is a reflection type detector which detects leakage of liquid into the internal space S by detecting reflected light, which comes from the internal space S, of the irradiation light radiated toward the internal space S from a light emitting element (light source).

This configuration makes it possible to reliably detect leakage of liquid by using a reflection type detector which is less likely to deteriorate due to the effect of liquid (for example, a corrosive solution).

The pressure sensor 100 of the present embodiment is configured such that portions of the housing 50 and the resin head 40b of the leak sensor 40, which are in abutment with the internal space S, are each formed of fluororesin and a portion of the pressure receiving surface 20a, which is in abutment with the internal space S, is formed of sapphire.

This configuration makes it possible to prevent an inconvenience that impurities dissolve due to the liquid flown into the internal space S, even when the diaphragm 30 is damaged due to deterioration over time, causing an inconvenience that liquid leaks into the internal space S.

Second Embodiment

Hereafter, a pressure sensor of a second embodiment of the present disclosure will be described with reference to the drawings.

The second embodiment is a modification of the first embodiment and, except what is described hereafter, is supposed to be the same as the first embodiment, thereby omitting the description thereof.

The pressure sensor 100 of the first embodiment is configured to include a diaphragm 30 having a substantially annular shape in plan view, and a protruding part 31 connected to the inner peripheral edge part of the diaphragm 30 and protruding further toward the pressure receiving surface 20a with respect to the plane where the diaphragm 30 is disposed.

Figure 4:
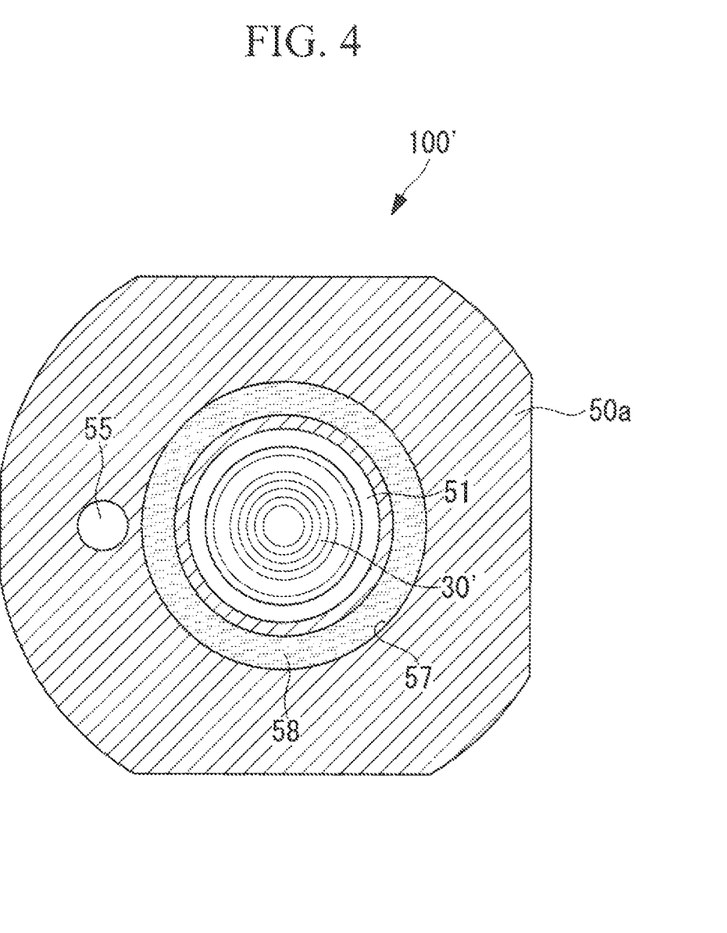
FIG. 4 is a cross sectional view of a pressure sensor of a second embodiment.

In contrast to that, the pressure sensor 100' of the present embodiment is configured such that the diaphragm 30' has a substantially circular shape in plan view; and the diaphragm 30' is deformed depending on the pressure of liquid which is introduced into the introduction flow path 10, thereby transferring the pressure of the liquid to the pressure receiving surface 20a.

As shown in FIG. 4, the diaphragm 30' of the present embodiment has a substantially circular shape in plan view. Where, FIG. 4 is a cross sectional view to show the pressure sensor 100' of the present embodiment as seen from the arrowed direction A-A in FIG. 1.

Figure 5:
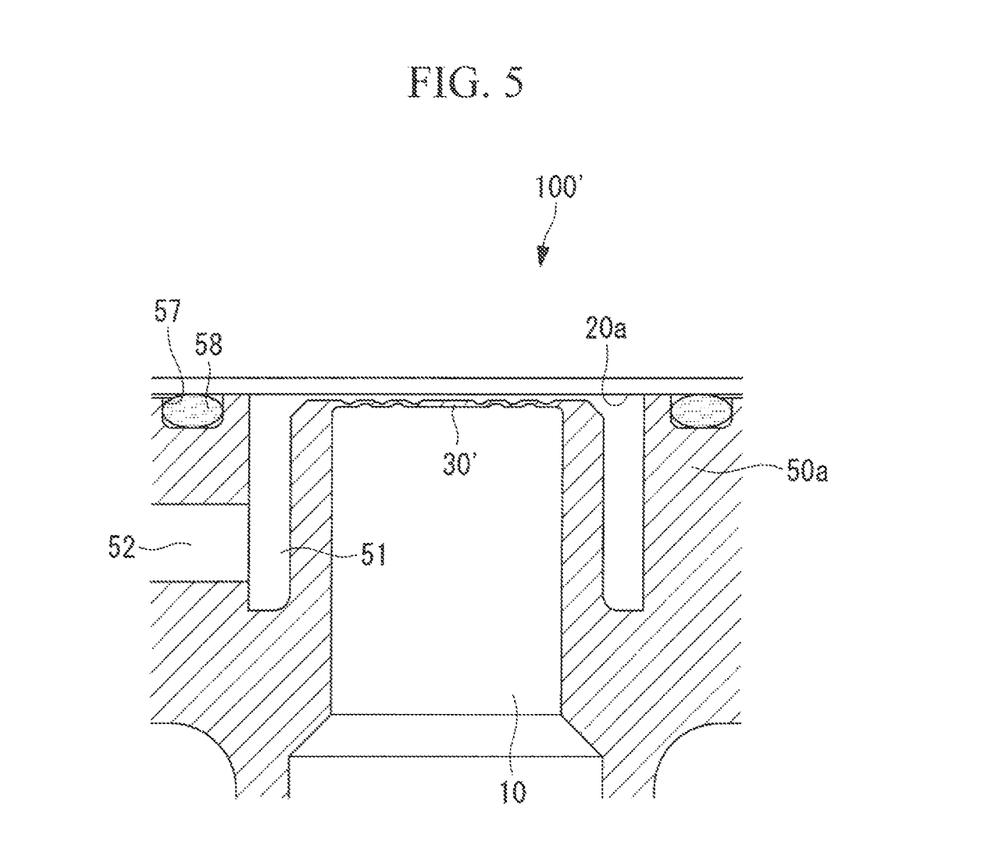
FIG. 5 is a longitudinal sectional view to show the vicinity of a diaphragm of the pressure sensor of the second embodiment.

As shown in FIG. 5, the diaphragm 30' of the present embodiment has a corrugated shape in sectional view.

The diaphragm 30 of the first embodiment is configured to transfer the pressure of liquid indirectly to the pressure receiving surface 20a via the protruding part 31. In contrast to that, the diaphragm 30' is configured to transfer the pressure of liquid directly to the pressure receiving surface 20a not via the protruding part 31.

According to the pressure sensor 100' of the present embodiment, it is possible to cause the diaphragm 30' having a substantially circular shape in plan view to be deformed depending on the pressure of the liquid, thereby transferring the pressure of the liquid to the pressure receiving surface 20a directly from the diaphragm 30' over a wide area thereof.

Third Embodiment

Hereafter, a pressure sensor of a third embodiment of the present disclosure will be described with reference to the drawings.

The third embodiment is a modification of the first embodiment and, except what is described hereafter, is supposed to be the same as the first embodiment, thereby omitting the description thereof.

The pressure sensor 100 of the first embodiment is configured such that the leakage detection hole 52, which extends in a direction normal to the X-axis from the vicinity of a bottom part of the annular recess 51 and has a substantially circular shape in sectional view, is formed, and the resin head 40*b* of the leak sensor 40 is exposed to the leakage detection hole 52.

Figure 6:
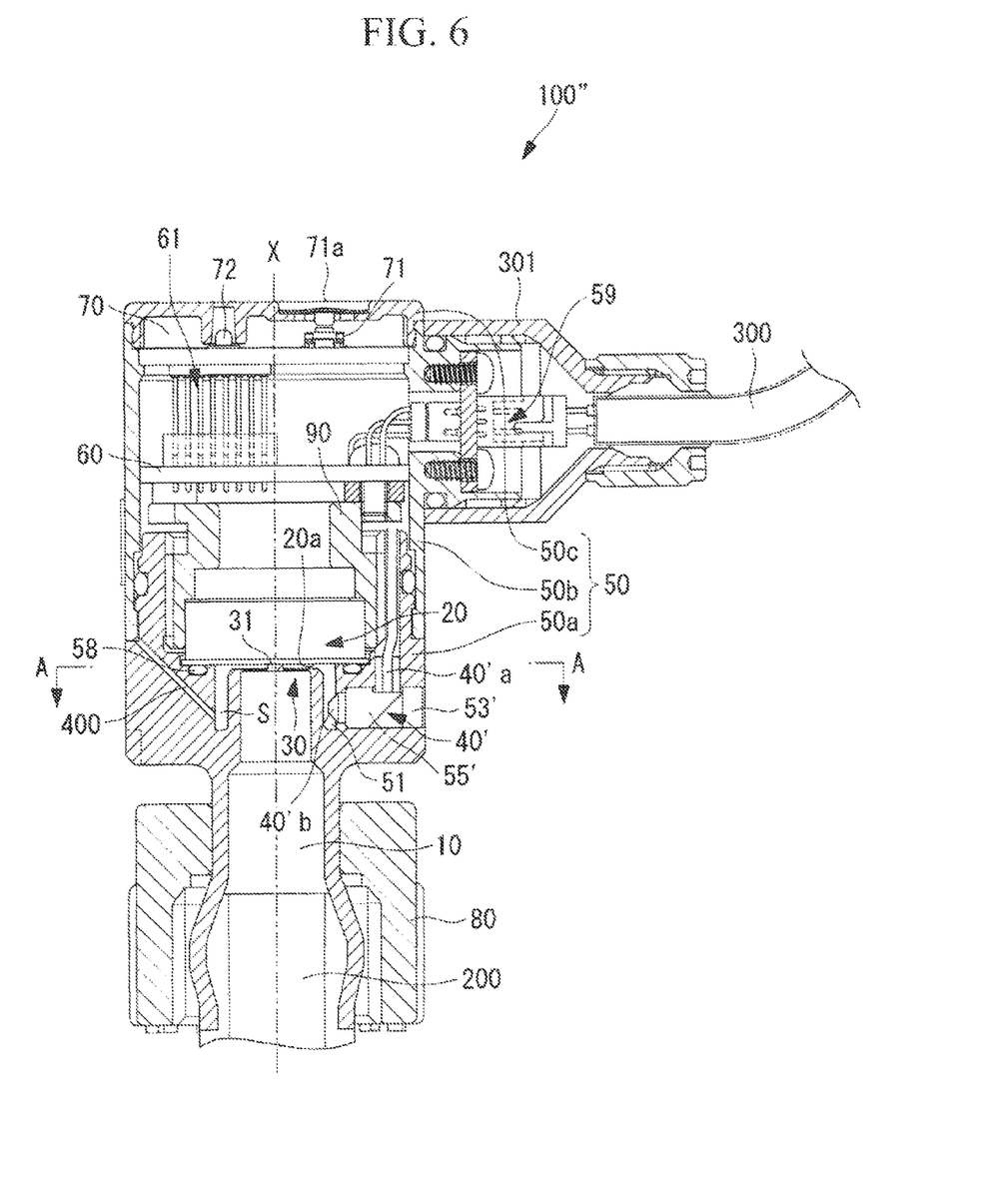
FIG. 6 is a longitudinal sectional view to show an internal structure of a pressure sensor of a third embodiment.

In contrast to that, the pressure sensor 100″ of the third embodiment is configured such that a leak sensor mounting hole 55′, which extends in a direction normal to the X-axis from the vicinity of a bottom part of the annular recess 51 and has a substantially circular shape in sectional view, is formed and a resin head of a leak sensor 40′ is exposed to the annular recess 51.

As shown in FIG. 6, a leak sensor mounting hole 55′, which extends in a direction normal to the X-axis, is provided in the body part 50*a*. A leak sensor 40′ is inserted into the leak sensor mounting hole 55′ such that a distal end of the resin head 40′*b* is exposed to the annular recess 51. The resin head 40′*b* is provided with a sealing member for preventing infiltration of liquid into the leak sensor mounting hole 55′ from the annular recess 51. Moreover, the optical fiber 40′*a* is provided with a caulking member for preventing infiltration of liquid.

A sealing plug 53′ for isolating the leak sensor mounting hole 55′ from the external space of the pressure sensor 100″ is provided in the outer side in the radial direction of the X-axis of the leak sensor mounting hole 55′. It is configured that the diameter of the outer peripheral surface of the sealing plug 53′ is substantially equal to the diameter of the inner peripheral surface of a mounting hole provided in the body part 50*a*. The sealing plug 53′ is press-fitted info the mounting hole provided in the body part 50*a*, thereby being mounted to the body part 50*a*.

The body part 50*a* of the present embodiment is provided with a communication flow path 400 which extends from the vicinity of a bottom part of the annular recess 51 to the outer peripheral surface of the body part 50*a*. The communication flow path 400 brings the internal space S and the outside of the pressure sensor 100″ (outside air) into communication with each other. Therefore, the internal space S becomes kept at the atmospheric pressure, and the deformation of the diaphragm 30′ will not be obstructed by the pressure of the internal space S so that an easily deferrable state thereof is maintained.

The pressure sensor 100″ of the present embodiment is configured such that the resin head 40′*b* of the leak sensor 40′ is exposed to the vicinity of a bottom part of the annular recess 51. This configuration makes it possible to detect leakage of liquid into the internal space S at earlier timing compared to the case of the pressure sensor 100 of the first embodiment.

Other Embodiments

Further, the present disclosure will not be limited to the above described embodiments, and changes may be appropriately made within a range not departing from the scope of the present disclosure.

The invention claimed is:

1. A pressure sensor for detecting pressure of liquid flowing in a main flow path, the pressure sensor comprising:
   an introduction flow path into which the liquid is introduced from the main flow path;
   a pressure detection part having a pressure receiving surface and for detecting the pressure of liquid received by the pressure receiving surface in the introduction flow path;
   a diaphragm provided in a downstream-side end part of the introduction flow path and for transferring the pressure of the liquid to the pressure receiving surface while isolating a contact between the liquid in the introduction flow path and the pressure receiving surface; and
   a leakage detection part for detecting a leakage of liquid into a space in communication with the pressure receiving surface, wherein the pressure receiving surface of the pressure detection part is disposed in the space.

2. The pressure sensor according to claim 1, wherein the introduction flow path and the diaphragm are integrally formed from a single material.

3. The pressure sensor according to claim 1, further comprising a communication flow path for bringing the space and the outside of the pressure sensor into communication with each other.

4. The pressure sensor according to claim 1, wherein:
   the diaphragm has an annular shape in plan view; and
   the pressure sensor further comprises a protruding part, which is connected to an inner peripheral edge part of the diaphragm, and protrudes further toward the pressure receiving surface with respect to a plane where the diaphragm is disposed,
   wherein the diaphragm transfers the pressure of liquid to the pressure receiving surface via the protruding part.

5. The pressure sensor according to claim 1, wherein:
   the diaphragm has a circular shape in plan view; and
   the diaphragm is deformed depending on the pressure of liquid which is introduced into the introduction flow path, thereby transferring the pressure of the liquid to the pressure receiving surface.

6. The pressure sensor according to claim 1, wherein the diaphragm has a corrugated shape in sectional view.

7. The pressure sensor according to claim 1, further comprising:
   a housing for accommodating the pressure detection part, wherein the pressure receiving surface has a substantially circular shape in plan view; and
   an O-ring for shutting off inflow of liquid from the space to the pressure detection part is provided in a contact part where an outer peripheral edge part of the pressure receiving surface and the housing are in contact with each other.

8. The pressure sensor according to claim 1, wherein the leakage detection part is a reflection type detector which detects leakage of liquid into the space by detecting reflected light, which comes from the space, of irradiation light radiated toward the space from a light source.

9. The pressure sensor according to claim 1, wherein:
   portions of the housing and the leakage detection part, which are in abutment with the space, are each formed of fluororesin; and
   a portion of the pressure receiving surface, which is in abutment with the space, is formed of sapphire.

10. The pressure sensor according to claim 1, further comprising:
    a housing for accommodating the pressure detection part, wherein:
    an annular recess is formed on the housing, the annular recess being disposed on an outer peripheral side at downstream-side end part of the introduction flow path; and the leakage detection part detects leakage of liquid into a bottom part of the annular recess.

* * * * *